United States Patent [19]
Dukes et al.

[11] 3,859,314

[45] Jan. 7, 1975

[54] PROCESS FOR PREPARING GLYCIDYL ESTERS OF POLYCARBOXYLIC ACIDS

[75] Inventors: Clifford F. Dukes; Robert W. Welch, both of Louisville, Ky.

[73] Assignee: Celanese Coatings & Specialities Company, New York, N.Y.

[22] Filed: June 29, 1967

[21] Appl. No.: 649,827

[52] U.S. Cl. .............................. 260/348.6
[51] Int. Cl. .............................. C07d 1/18
[58] Field of Search .................. 260/348.6

[56] References Cited
UNITED STATES PATENTS

| | | | |
|---|---|---|---|
| 2,567,842 | 9/1951 | Erickson | 260/348.6 |
| 3,053,855 | 9/1962 | Maerker et al. | 260/348.6 |
| 3,075,999 | 1/1963 | June et al. | 260/348 |
| 3,178,454 | 4/1965 | Kloos et al. | 260/348.6 |
| 3,372,142 | 3/1968 | Smith | 260/348.6 X |

*Primary Examiner*—Norma S. Milestone
*Attorney, Agent, or Firm*—Herbert P. Price; K. A. Genoni; T. J. Morgan

[57] ABSTRACT

A process for preparing glycidyl esters of polycarboxylic acids by catalytically reacting epichlorohydrin and a polycarboxylic acid at a temperature no higher than about 200°F. to form chlorohydrin esters followed by dehydrohalogenation with alkali metal hydroxide at a temperature of 90° to 130°F.

11 Claims, No Drawings

PROCESS FOR PREPARING GLYCIDYL ESTERS OF POLYCARBOXYLIC ACIDS

BACKGROUND OF THE INVENTION

This invention pertains to glycidyl esters of polycarboxylic acids, processes for preparing said esters and uses for said esters in coatings and plastics.

The reaction of glycidol with polycarboxylic acid chlorides to prepare glycidyl esters is described in U.S. Pat. No. 2,865,897. This process is disadvantageous in that the starting materials, glycidol and the acid chlorides, are very reactive and unstable, requiring extreme care in preparation, storage and utilization. In addition the reaction of these compounds to form the glycidyl esters requires very low temperatures and long reaction times.

The epoxidation of allyl esters of polycarboxylic acids to form glycidyl esters is described in U.S. Pat. No. 2,870,170. Although this process avoids the use of glycidol and acid chlorides, it has disadvantages in that allyl groups are somewhat difficult to epoxidize leading to low yields of the completely epoxidized products with considerable amounts of partially epoxidized esters plus other side reaction products.

Several methods for preparing glycidyl esters by the reaction of epichlorohydrin with polycarboxylic acids have been proposed. U.S. Pat. No. 2,772,296 discloses the catalytic addition of epichlorohydrin to the acid to form the chlorohydrin ester followed by heating to effect a disproportionation reaction between unreacted epichlorohydrin and the chlorohydrin ester to form glycidyl esters and glycerol dichlorohydrin. This diproportionation reaction is an equilibrium reaction which hinders the effective production of high yields of glycidyl esters. The esters so produced are mixed glycidyl-chlorohydrin esters. Extensive purification is required to separate the glycidyl esters from the by-products and to separate the glycerol dichlorohydrin from the epichlorohydrin.

Glycidyl esters of polycarboxylic acids have been prepared by reacting the dry potassium salt of the acids with epichlorohydrin as described in U.S. Pat. Nos. 2,448,602 and 2,940,986. The preparation of the anhydrous salt is very slow and difficult due to foaming and caking. Completely anhydrous conditions are difficult to attain, and when some moisture is present, low yields and impure products result.

A seemingly preferred method for preparing glycidyl esters of polycarboxylic acids is described in U.S. Pat. No. 3,075,999. By this method the polycarboxylic acid is reacted catalytically with epichlorohydrin at the reflux temperature of epichlorohydrin to form the chlorohydrin ester. The chlorohydrin ester is then dehydrohalogenated with alkali at a temperature of 70°C to 117°C to form the glycidyl ester. The disadvantages of this process are the formation of undesirable by-products during the initial addition reaction, the saponification of ester groups during the dehydrohalogenation reaction, and the loss of epichlorohydrin through side reactions in the over-all process. Low yields of unreacted epichlorohydrin and glycidyl esters, which are difficult to isolate and purify, result.

SUMMARY OF THE INVENTION

By this invention glycidyl esters of polycarboxylic acids are prepared by the catalytic addition of epichlorohydrin to the polycarboxylic acid using an excess of epichlorohydrin to form chlorohydrin esters of the polycarboxylic acid followed by dehydrohalogenation of the chlorohydrin esters with alkali metal hydroxides to form the glycidyl esters, wherein the temperatures of the addition reaction and of the dehydrohalogenation reaction are controlled within narrowly defined limits. By keeping the temperature of the initial addition reaction at or below 200°F and by controlling the temperature during the dehydrohalogenation reaction between about 90°F to 130°F high yields of glycidyl esters with good purity and high recovery of unreacted epichlorohydrin can be obtained.

Anhydrous conditions are not required for carrying out the process of this invention. Epichlorohydrin which has been recovered from previous reactions and which contains a small amount of dissolved water can be used. The difficult formation of the anhydrous alkali metal salt of the acid is unnecessary.

By using a temperature at or below 200°F during the addition reaction of the epichlorohydrin and the acid, the formation of the 2-hydroxy, 3-chloro, propoxy-1group (1,2-chlorohydrin group) is enhanced while the formation of the 1-hydroxy, 3-chloro, propoxy-2group (1,3-chlorohydrin) is minimized. Dehydrohalogenation of the 1,2-chlorohydrin produces the glycidyl or 1,2-epoxy group. The 1,3-chlorohydrin is not dehydrohalogenated under normal conditions and does not produce a glycidyl group. The presence of 1,3-chlorohydrin groups results in low epoxide content and high chlorine in the final product.

By maintaining the temperature between about 90°F and 130°F during the dehydrohalogenation step, side reactions are minimized and substantially complete dehydrohalogenation is obtained. Side reactions which are kept to a minimum include saponification of the ester groups, polymerization and hydrolysis of the glycidyl groups and formation of polyepichlorohydrin, glycerol and monochlorohydrins from the excess epichlorohydrin.

DESCRIPTION OF THE INVENTION

The polycarboxylic acids which are used in the process of this invention contain at least two carboxylic acid groups and no other groups reactive with epoxide groups. The polycarboxylic acids can be aliphatic, cycloaliphatic, aromatic and heterocyclic. The preferred acids are those which contain not more than about 18 carbon atoms per carboxylic acid group. Examples of suitable acids include oxalic acid, sebacic acid, adipic acid, succinic acid, pimelic acid, suberic acid, glutaric acid, dimer and trimer acids of unsaturated fatty acid, such as dimer and trimer acids of linseed fatty acids, phthalic acid, isophthalic acid, terephthalic acid, trimellic acid, trimesic acid, phenylene-diacetic acid, chlorendic acid, hexahydrophthalic acid, diphenic acid, naphthalic acid, polyacid terminated esters of dibasic acids and aliphatic polyols, polymers and copolymers of acrylic acid, methacrylic acid, crotonic acid, and the like.

It is preferred to use epichlorohydrin as the reactant with the polycarboxylic acid. However, epibromohydrin and epiiodohydrin can be used and are considered equivalent for the purposes of this invention.

The amount of epichlorohydrin which is used in this process is in excess of that which will react with each acid group of the polycarboxylic acid. This excess epichlorohydrin serves as a solvent for the chlorohydrin esters formed in the addition reaction and also as a solvent for the glycidyl esters formed in the dehydrohalogenation reaction. Generally at least about two mols of epichlorohydrin are used for each carboxylic acid group of the polycarboxylic acid with the preferred range being about 5 to about 10 mols of epichlorohydrin for each carboxylic acid group.

The catalysts used for effecting the addition of the epichlorohydrin with the carboxylic acid groups are tertiary amines, tertiary amine salts and quaternary ammonium compounds. Examples of each compounds are triethyl amine, tributyl amine, benzyl dimethyl amine, triethyl amine hydrochloride, tripropyl amine hydrobromide, benzyl trimethylammonium hydroxide, tetramethylammonium chloride, tetramethylammonium bromide, tetramethylammonium iodide, trimethylethylammonium acetate and anion exchange resins. The preferred catalyst is tetramethylammonium chloride. The amount of catalyst which is used in this process is 0.5 to about 5% by weight based on the weight of the polycarboxylic acid with the preferred range being 1 to 3%.

In carrying out the first step of the process of this invention, the epichlorohydrin, polycarboxylic acid and catalyst are added to a suitable reactor and heat is applied while stirring to raise the temperature to 150°F to 200°F with the preferred range being 170°F to 180°F. Heating and stirring are continued for a time sufficient to lower the acid value to 0. Generally this requires about 1 to 4 hours. In some instance the polycarboxylic acid is insoluble in the epichlorohydrin. However, as the reaction progresses, the acid gradually dissolves in the epichlorohydrin forming a homogeneous solution with subsequent reduction of the acid value to zero.

In conducting the second step of the process of this invention alkali metal hydroxides are used as the dehydrohalogenating agents. The alkali metal hydroxides can be added in powdered, flake or pellet form, but preferably they are added as aqueous solutions, generally at 30 to 70 weight % concentration. The preferred alkali metal hydroxides are sodium and potassium hydroxide with the most preferred being sodium hydroxide. The amount of alkali metal hydroxide that is used is substantially equivalent to the chlorine content of the chlorohydrin ester formed in the first reaction. Generally the amount of alkali metal hydroxide will be from about 1.0 to 1.3 mols for each chlorine of the chlorohydrin ester.

After the first step of this process is completed as evidenced by the acid value being zero, the temperature of the solution of chlorohydrin ester of the polycarboxylic acid in epichlorohydrin is adjusted to 90°F to about 130°F. The addition of the alkali metal hydroxide is begun while applying sufficient vacuum to continuously remove the water from the reactants as a water-epichlorohydrin distillate. The water is separated from the distillate and the epichlorohydrin is continuously returned to the reactor. The temperature during the dehydrohalogenation reaction is controlled between 90°F and 130°F with the preferred temperatures being 100°F to 110°F. The reduced pressure under which the reaction is conducted is the pressure sufficient to allow removal of the water at the reaction temperature. Generally this reduced pressure will be about 5 to 100 mm Hg absolute. The time required to complete the dehydrohalogenation reaction will vary somewhat depending upon the addition rate of the alkali metal hydroxide as well as the exact temperature of the reaction, but will generally be in the range of 1 to 8 hours. After the dehydrohalogenation reaction is completed, the glycidyl ester of the polycarboxylic acid can be recovered by several well known methods. The salt can be removed by filtration, centrifugation or by addition of water to dissolve the salt with subsequent removal of the brine layer. The epichlorohydrin is then removed by distillation and the glycidyl ester product is recovered.

The following examples describe the process of this invention in detail. Parts where used are parts by weight.

EXAMPLE 1

A suitable reactor was equipped with a mechanical stirrer, a thermocouple attached to a temperature recording device, an inlet tube, a vacuum connection and a condenser fitted with a well for collecting distilled water and epichlorohydrin from which the water could be withdrawn and the epichlorohydrin could be returned to the reactor. To the reactor were added 400 parts adipic acid, 2533 parts epichlorohydrin and 8 parts tetramethylammonium chloride. Agitation was begun and heat was applied raising the temperature to 175°F. The temperature was held at 175°F for 1 hour and 30 minutes at which time the acid value of the solution was 0 indicating complete esterification of the adipic acid.

The reactants were cooled to 105°F and vacuum was applied lowering the pressure within the reactor to about 10mm Hg pressure. A 50% aqueous solution of sodium hydroxide (438 parts) was added to the reactants over a period of 5 hours and 15 minutes, while maintaining a temperature of 100°-110°F and sufficient vacuum to continuously distill water and epichlorohydrin. 320 parts of water were separated from the distillate while the epichlorohydrin was returned to the reactor. After all the sodium hydroxide had been added, the temperature was held at 110°F for 30 minutes, during which time 5 additional parts of water were removed. The vacuum was released and 500 parts of water were added to the reactor. When all the salt, which had formed from the dehydrohalogenation reaction, was dissolved, agitation was stopped to allow the brine layer to separate from the organic layer. The brine layer was then drawn off and discarded.

The temperature of the reactants was adjusted to 100°F, the pressure was reduced to 10 mm. Hg and an additional 176 parts of 50% aqueous sodium hydroxide were added over a period of 1 hour and 55 minutes. After all the sodium hydroxide had been added, the temperature was held at 100°F to 110°F for 30 minutes. The total amount of distilled water separated during this step of the reaction was 140 parts. The salt formed in the reaction was dissolved in 1,000 parts of water and was withdrawn as described above. The epichlorohydrin was removed from the product by distillation to a pot temperature of 305°F under 10 mm Hg pressure. 540 parts of diglycidyl adipate were recovered having an epoxide equivalent weight of 144 (theoretical-129), a total chlorine content of 2.12% and a Garner-Holdt viscosity at 25°C of $A_1$.

100 parts of the diglycidyl adipate were blended with 94 parts of hexahydrophthalic anhydride and 0.5 part of diethylaminoethanol. The blend was heated slightly with stirring until a clear solution was obtained. The solution was poured into a mold and was cured by heating 2 hours at 100°C and 18 hours at 125°C. The cured casting after 256 hours exposure in an accelerated weather machine (AWM) was unaffected.

The cured casting had a tensile strength of 9,620 psi, and tensile elongation of 7.5%. The heat distortion temperature was 68°C, the Shore D hardness was 84, the water absorption after 24 hours at 25°C was 0.19%, and the weight loss after 24 hours at 300°F was 0.18.

EXAMPLE 2

To a reactor equipped as described in Example 1, were added 862 parts of isophthalic acid, 4800 parts of epichlorohydrin and 17 parts of tetramethylammonium chloride. The reactants were heated at 175°F until the acid value was reduced to 0, a period of 1 hour and 45 minutes. The temperature was lowered to 110°F, vacuum (75 mm Hg pressure) was applied, and 1016 parts of 50% aqueous sodium hydroxide were added intermittently over a period of 6 hours and 35 minutes using the procedure as described in Example 1. The salt of reaction was removed by dissolution in 2500 parts and 2000 parts respectively of wash water and the epichlorohydrin was removed by distillation as described in Example 1. 1080 parts of diglycidyl isophthalate were recovered having an epoxide equivalent weight of 152 (theoretical-139) a total chlorine content of 0.8%, and a Garner-Holdt viscosity at 25% C of $Z_1$.

A cured casting was prepared from 100 parts of diglycidyl isophthalate, 96 parts of hexahydropthalic anhydride and 0.5 part of diethylaminoethanol heated 2 hours at 100°C and 18 hours at 125°C. The casting was unaffected after 256 hours AWM exposure.

The tensile strength of this cured casting was 14,740 psi with tensile elongation of 5.9%. The heat distortion temperature was 120°C, Shore D hardness was 88, water absorption after 24 hours at 25°C was 0.12% and weight loss after 24 hours at 300°F was 0.22%. The electrical properties (volume resistivity in ohm-cm) were:

| Temp. °F | Ohm—CM |
|---|---|
| 77 | $2.5 \times 10^{15}$ |
| 150 | $2.3 \times 10^{15}$ |
| 200 | $6.3 \times 10^{14}$ |
| 266 | $1.0 \times 10^{13}$ |
| 302 | $6.8 \times 10^{11}$ |
| 356 | $4.8 \times 10^{10}$ |
| 392 | $1.1 \times 10^{10}$ |

The dissipation factor ($D_f$) and dielectric constant ($D_k$) at 77°F were 0.012 and 360 respectively.

A cured casting prepared from a blend of 100 parts of diglycidyl isophthalate and 31 parts of triethylene tetramine was well cured after 2 weeks at 77°F. This casting had a tensile strength of 9,110 psi with tensile elongation of 1.7%. The heat distortion temperature was 67°C, Shore D hardness was 85, water absorption after 24 hours at 25°C was 0.10% and weight loss after 24 hours at 300°F was 0.51%.

EXAMPLe 3

Using the same procedure as described in Example 1, 400 parts of terephthalic acid were reacted with 2228 parts of epichlorohydrin and 8 parts of tetramethylammonium chloride at a temperature of about 200°F for 6 hours until the acid value was 0. Dehydrohalogenation was conducted with 393 parts of 50% aqueous sodium hydroxide added over a 4 hour period at a temperature of 105°–130°F and a pressure of 21 mm Hg. 397 parts of diglycidyl terephthalate were recovered using the procedure described in Example 1 having an epoxide equivalent weight of 185.6 (theoretical-139) and a total chlorine content of 4.6%.

EXAMPLe 4

Using the same procedure as described in Example 1, 400 parts of azelaic acid were reacted with 1932 parts of epichlorohydrin and 8 parts of tetramethylammonium chloride at a temperature of 175°F for 1 hour and 10 minutes until the acid value was reduced to zero. Dehydrohalogenation was carried out by the addition of 341.7 parts of 50% aqueous sodium hydroxide over a period of 2 hours and 40 minutes at a temperature of 105°–125°F and a pressure of 10 mm Hg. After the addition of 1000 parts of water and subsequent removal of the brine, an additional 68.3 parts of 50% aqueous sodium hydroxide were added over 45 minutes at 105° and 10 mm Hg pressure. After removing the salt by dissolution in 1000 parts of water, the glycidyl product was recovered as described in Example 1. The diglycidyl azelate product (521 parts) had an epoxide equivalent weight of 173.9 (theoretical-150), a chlorine content of 2.26%, and a Gardner-Holdt viscosity at 25°C of $A_1$ - A.

100 parts of diglycidyl azelate were cured with 89 parts of hexahydrophthalic anhydride and 0.5 part of diethylaminoethanol by heating for 2 hours at 100°C and 18 hours at 125°C. The cured casting had a tensile strength of 9,620 psi with 7.5% tensile elongation. The heat distortion temperature was 68°C, the Shore D hardness was 84, water absorption after 24 hours at 25°C was 0.19%, and weight loss after 24 hours at 300°F was 0.18%.

EXAMPLE 5

Using the same procedure as described in Example 1, 1000 parts of dimer acids were reacted with 1595 parts of epichlorohydrin and 10 parts of tetramethylammonium chloride at 200°F for 1 hour and 15 minutes. The dimer acids used were derived from 18 carbon atom unsaturated fatty acids and had a Gardner-Holdt viscosity at 25°C of $Z_3$-$Z_4$, an average molecular weight of 580, an acid value of 193 and with a dimer content of 97%.

After the addition reaction was completed dehydrohalogenation was conducted with 281 parts of 50% aqueous sodium hydroxide at a temperature of 105°–111°F and 14 mm Hg pressure. The isolated diglycidyl ester of dimer acids had an epoxide equivalent weight of 422 (theoretical-346), a chlorine content of 1.86% and a Gardner-Holdt viscosity at 25°C of P.

EXAMPLES 6–8

Adipic acid, 400 parts, was reacted in 2533 parts of epichlorohydrin using tetramethylammonium chloride catalyst, followed by dehydrohalogenation with 447 parts of 50% aqueous sodium hydroxide. Three separate reactions were carried out under substantially identical conditions except for variations in the addition reaction temperature and in the dehydrohalogenation temperature. The results of these reactions are as follows:

| Example | Addition Reaction °F | Dehydro-halogenation Reaction °F | Epoxide Equivalent | %Cl |
| --- | --- | --- | --- | --- |
| 6 | 175–180 | 105–110 | 163.3 | 3.9 |
| 7 | 175 | 160 | 234 | 4.4 |
| 8 | 243 | 100–105 | 192.4 | 5.4 |

The glycidyl esters of polycarboxylic acid prepared by the process of this invention can be utilized in a variety of applications. They can be cured with aliphatic amines, aromatic amines, polycarboxylic acids, polycarboxylic acid anhydrides, Lewis acids, polymercaptans, carboxylic acid containing vinyl and acrylic copolymers, polyphenols and the like.

Curing agents for epoxide resinc can be prepared from these glycidyl esters by reacting them with polyamines, polymercaptans and polycarboxylic acid using the co-reactant in excess over the epoxide groups of the glycidyl ester so that the curing agents contain the functional amine, mercaptan or acid groups rather than the epoxide group.

These glycidyl esters can be polymerized to intermediate and high molecular weight polymers by reaction with dicarboxylic acids, dihydric phenols or dihydric alcohols. The intermediate molecular weight polymers can be modified by esterification with fatty acids to form air-drying and heatcuring coating compositions. The intermediate and high molecular weight polymers can also be cured by reaction with polyisocyanates, aminoplast resins, phenol-aldehyde resins and acid containing acrylic copolymers. The high molecular weight polymers can also be used without further modification as thermoplastic molding compositions.

Glycidyl esters derived from low molecular weight acids, such as the phthalic acids and adipic acid, have a tendency to crystallize upon standing. In some instances this tendency to crystallize is advantageous in that high purity products can be isolated readily and the crystals can be used to prepare solid stable molding powders, fluidized bed powders and the like. However, for many uses low viscosity fluid glycidyl esters are preferred since the fluid resins can be easily removed from their storage containers, and readily metered or weighed for use. Low viscosity resins can be easily blended with a variety of curing agents and will tolerate a high level of fillers for further modifications. In order to keep the glycidyl ethers in the fluid low viscosity state, they can be reacted with small amounts of epoxide reactive compositions, such as mono and polyamines, mono and polyphenols, mono and polybasic acids, mono and poly mercaptans, mono and poly organic isocyanates and the like. The amount of modifiers that can be used should be sufficient to inhibit crystallization, but should not be enough to cross-link the glycidyl esters or polymerize them to any great extent. The amount of modifiers can be varied quite widely depending upon the functionality of the glycidyl ester and the weight per functional group of the modifier. Generally, however, the amount of modifiers will be about 1 to about 10% by weight based on the weight of the glycidyl ester.

Glycidyl esters of polycarboxylic acids can be purified by extraction, crystallization, or distillation for use in specialty applications where high purity is required.

Glycidyl esters and their derivatives can be used as modifiers for conventional epoxide resins derived from polyhydric phenols, polyhydric alcohols and cycloaliphatic compounds. The glycidyl esters can be used as reactive diluents for the conventional epoxide resins by simply blending the ester with resin. The esters can also be used as plasticizers for the conventional epoxide resins as well as means for improving the adhesive, film and resistance properties in many applications.

Glycidyl esters can be used as vinyl stabilizers, in molding, encapsulating and laminating applications, and in conventional solution type paints as well as in 100% solids coatings. Particularly important uses for these glycidyl esters and derivatives are in the formulation and preparation of non-chalking, weather resistant coatings and molded articles.

It is to be understood that the foregoing detailed description is given merely by way of illustration and that many variations may be made therein without departing from the spirit of the invention.

The embodiments of this invention is which an exclusive property or privilege is claimed are defined as follows:

1. A process for producing glycidyl esters of polycarboxylic acids which consists essentially of reacting a polycarboxylic acid with epichlorohydrin using as a catalyst a tertiary amine, tertiary amine salt, or quaternary ammonium compound, wherein at least 2 mols of epichlorohydrin are present for each carboxylic acid group of the polycarboxylic acid, to form the chlorohydrin ester of the polycarboxylic acid and subsequently dehydrohalogenating the chlorohydrin ester with an alkali metal hydroxide in an amount substantially equivalent to the chlorine content of the chlorohydrin ester to form the glycidyl ester, the improvement which consists essentially of:
   1. conducting the reaction of the epichlorohydrin and the polycarboxylic acid at a temperature of 150°F to 200°F for a time sufficient to reduce the acid value to zero; and
   2. dehydrohalogenating the formed chlorohydrin ester by slow addition of the alkali metal hydroxide at a temperature of 90°F to 130°F and under reduced pressure sufficient to distill and remove the water formed in the reaction at the reaction temperature.

2. The process of claim 1 wherein the epichlorohydrin and the polycarboxylic acid are reacted at a temperature of 170°F to 180°F and the dehydrohalogenation reaction is conducted at a temperature of 100°–110°F.

3. The process of claim 1 wherein the dehydrohalogenation reaction is conducted at a pressure of 5 to 100 mm Hg absolute.

4. The process of claim 1 wherein 5 to 10 mols of epichlorohydrin are present for each acid group of the polycarboxylic acid and wherein 1 to 1.3 mols of alkali metal hydroxide are used for each chlorine of the chlorohydrin ester.

5. The process of claim 1 wherein the polycarboxylic acid is isophthalic acid.

6. The process of claim 1 wherein the polycarboxylic acid is adipic acid.

7. The process of claim 1 wherein the polycarboxylic acid is azelaic acid.

8. The process of claim 1 wherein the polycarboxylic acid is the dimer of an 18 carbon atom unsaturated acid.

9. The process of claim 1 wherein the catalyst is tetramethylammonium chloride and the alkali metal hydroxide is sodium hydroxide.

10. The process of claim 9 wherein the sodium hydroxide is in the form of an aqueous solution at 30 to 70 weight percent concentration.

11. A process for producing glycidyl esters of polycarboxylic acids by reacting a polycarboxylic acid with epichlorohydrin in the presence of a tertiary amine, quaternary ammonium base or quaternary ammonium salt as a catalyst at a temperature above 65°C to 93°C, whereby at least 2 mols of epichlorohydrin are present for each carboxylic acid group of the polycarboxylic acid, for a time sufficent to reduce the acid value to zero, and then immediately dehydrohalogenating the formed chlorohydrin ester by slow addition of an alkali metal hydroxide at a temperature of 32°C to 54°C and under reduced pressure sufficient to distill and remove the water formed in the reaction at the reaction temperature.

* * * * *